United States Patent [19]

Lohneis et al.

[11] 4,087,901
[45] May 9, 1978

[54] TOOL CHANGE MECHANISM FOR MACHINE TOOLS

[75] Inventors: Earl R. Lohneis; Frank Zankl, both of Milwaukee, Wis.

[73] Assignee: Kearney & Trecker Corporation, West Allis, Wis.

[21] Appl. No.: 714,496

[22] Filed: Aug. 16, 1976

[51] Int. Cl.² .............................................. B23Q 3/157
[52] U.S. Cl. ...................................................... 29/568
[58] Field of Search .......................................... 29/568

[56] References Cited

U.S. PATENT DOCUMENTS

| | | | |
|---|---|---|---|
| 3,458,924 | 8/1969 | Oslebo et al. | 29/568 |
| 3,760,491 | 9/1973 | Zankl et al. | 29/568 |
| 3,953,918 | 5/1976 | Bone et al. | 29/568 |

*Primary Examiner*—Othell M. Simpson
*Assistant Examiner*—Z. R. Bilinsky
*Attorney, Agent, or Firm*—Cyril M. Hajewski

[57] ABSTRACT

The tool change mechanism includes a tool storage magazine having a plurality of tool storage sockets disposed in two concentric circles. A tool transfer arm is mounted within the inner circle of sockets. The transfer arm may be rotated and extended or retracted and moved toward and away from the magazine for extracting a previously used tool from a ready socket and inserting such tool into a designated socket of the magazine. In like manner, the transfer arm will operate to extract a selected tool from any one of the sockets in the magazine and transfer it to the ready socket. The latter is mounted on a carrier which also supports a tool change arm. The carrier is pivotable between a loading position and a tool change position. When the carrier is in the loading position, the ready socket is located at the magazine where it is accessible to the tool transfer arm for extracting previously used tools from the ready socket and inserting new tools into it. On the other hand, when the carrier is in the tool change position it is located adjacent to the spindle in position to enable the tool change arm to interchange tools between the ready socket and the spindle.

13 Claims, 14 Drawing Figures

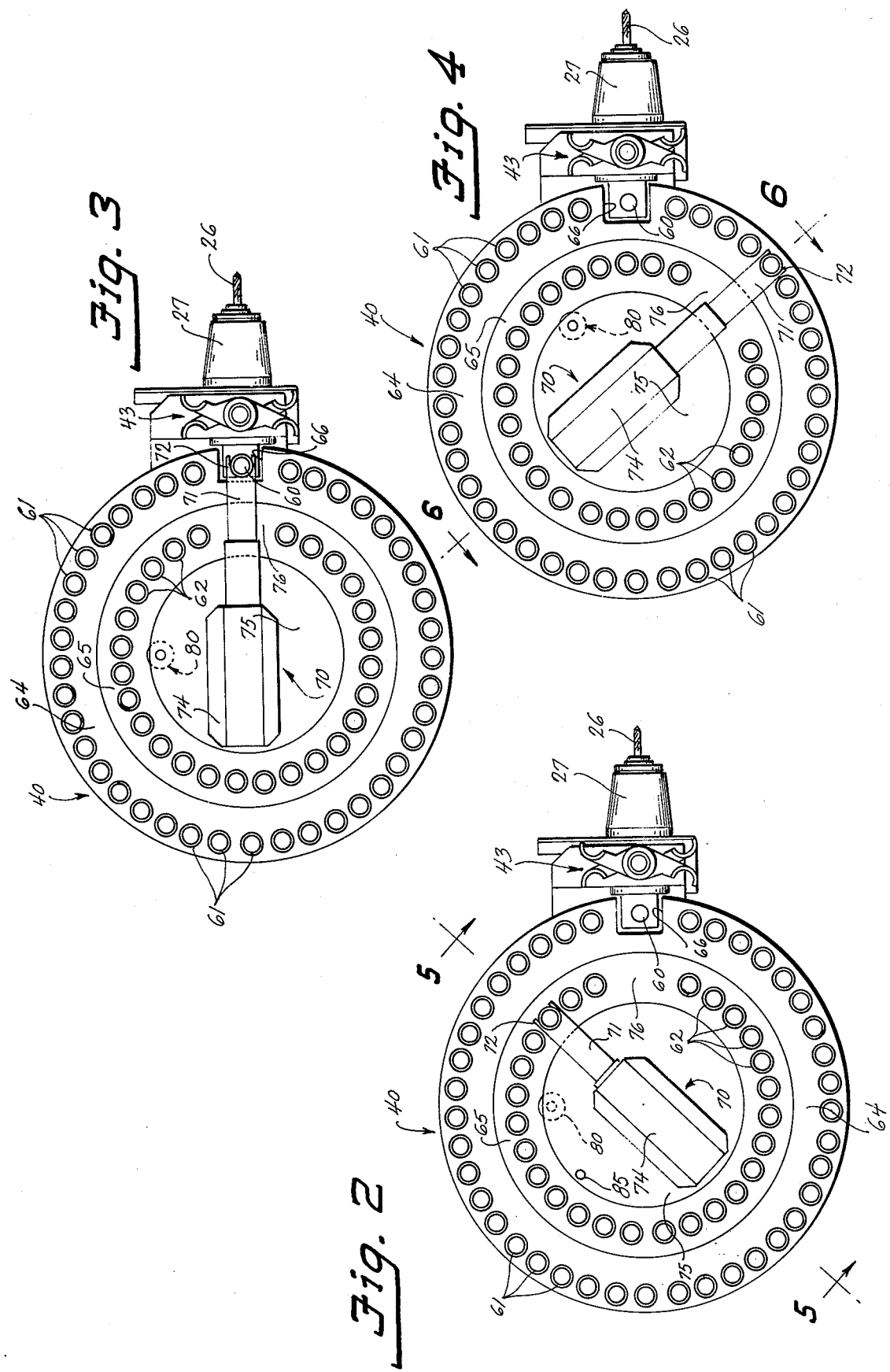

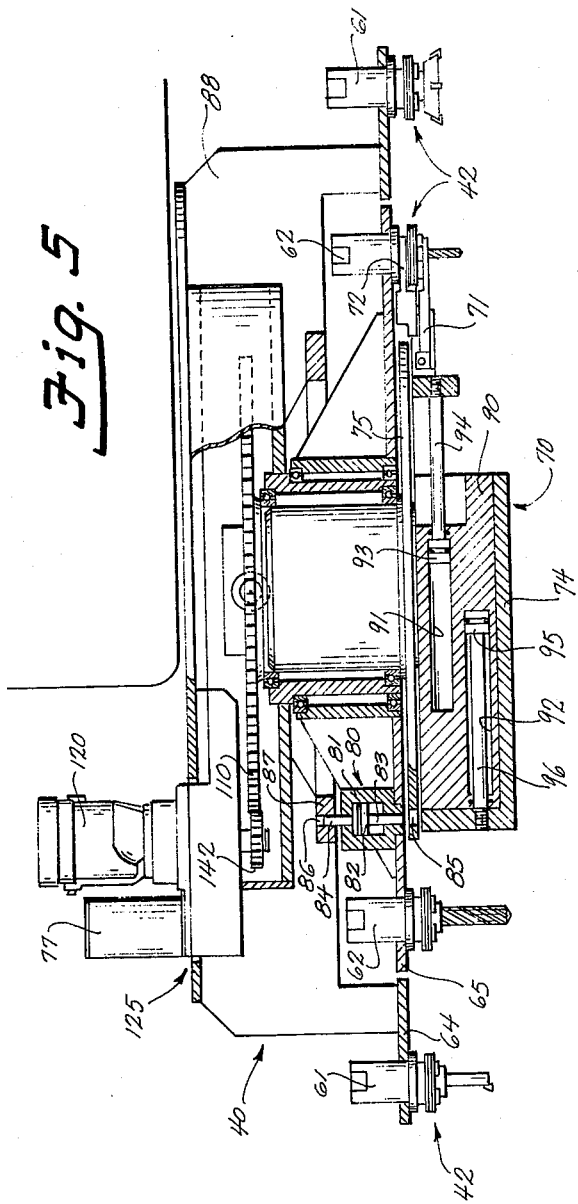
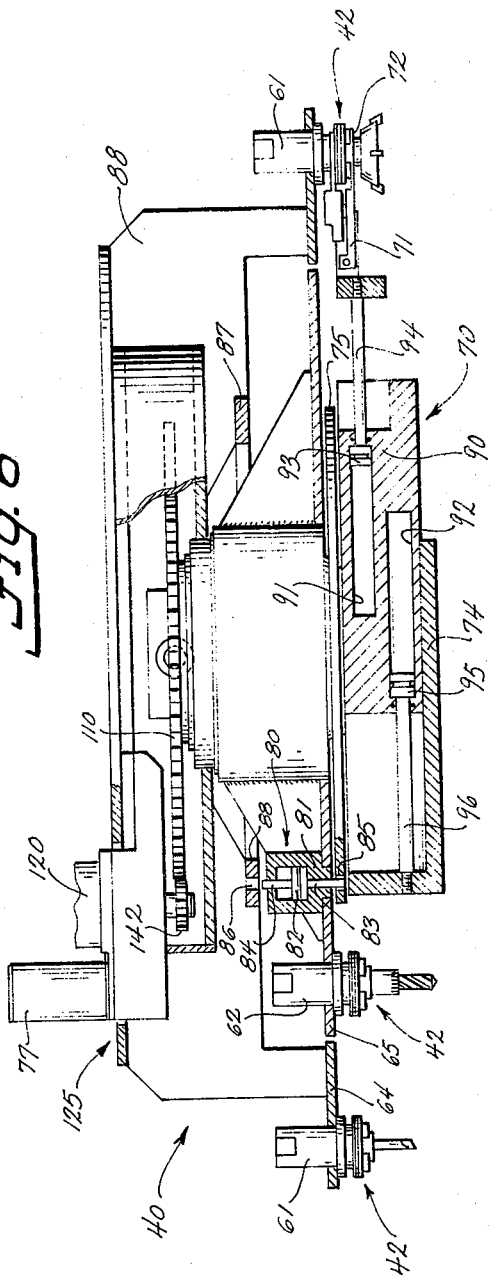

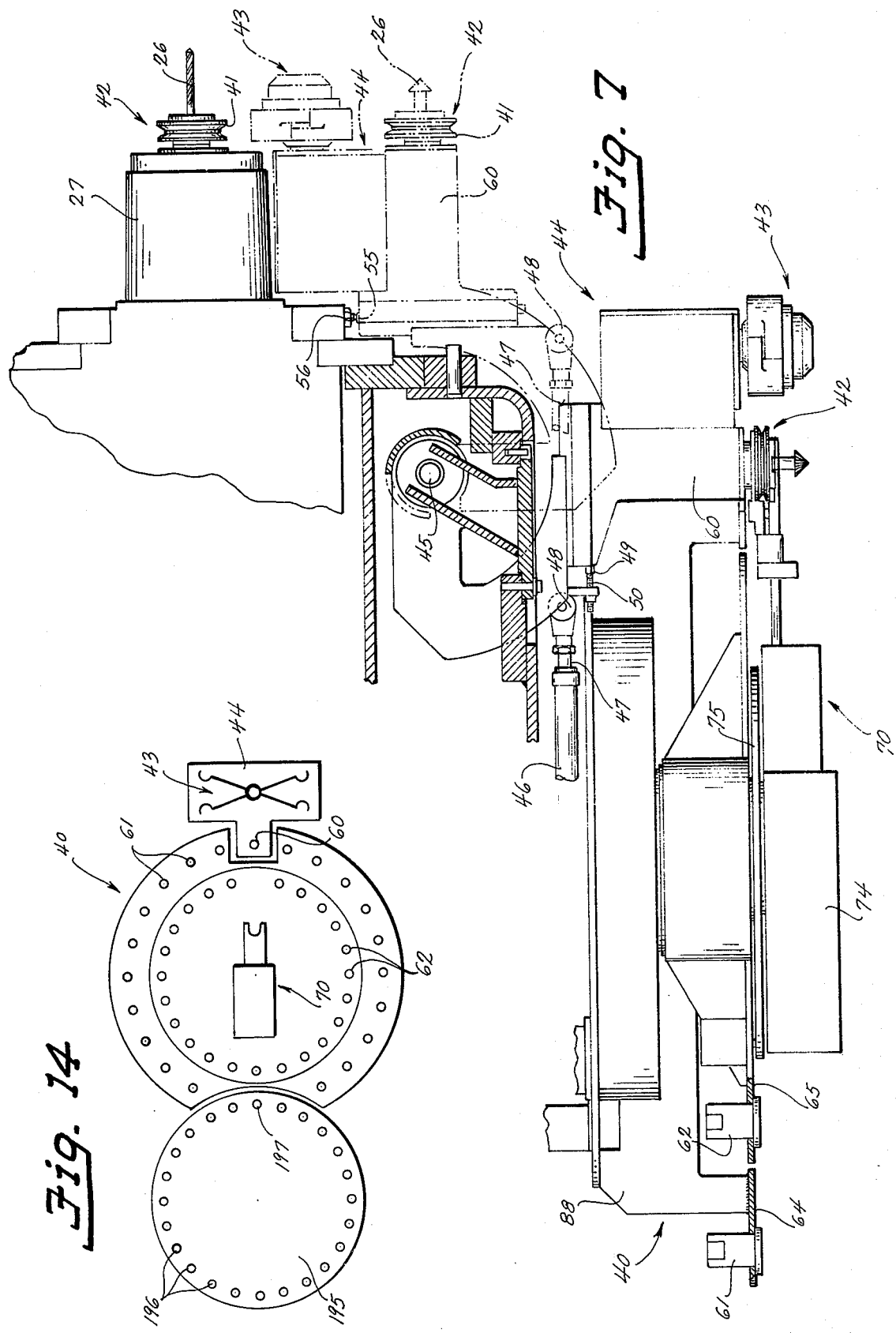

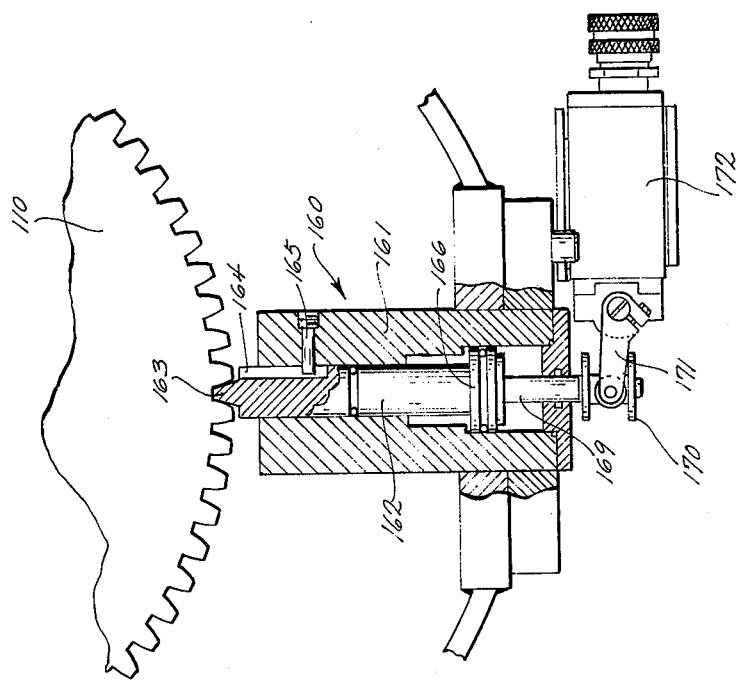
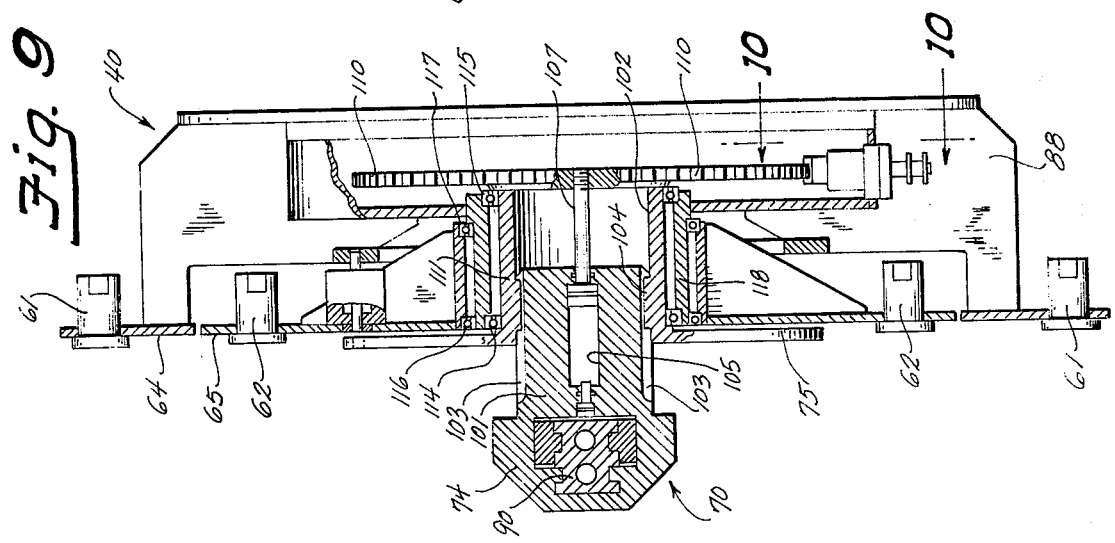
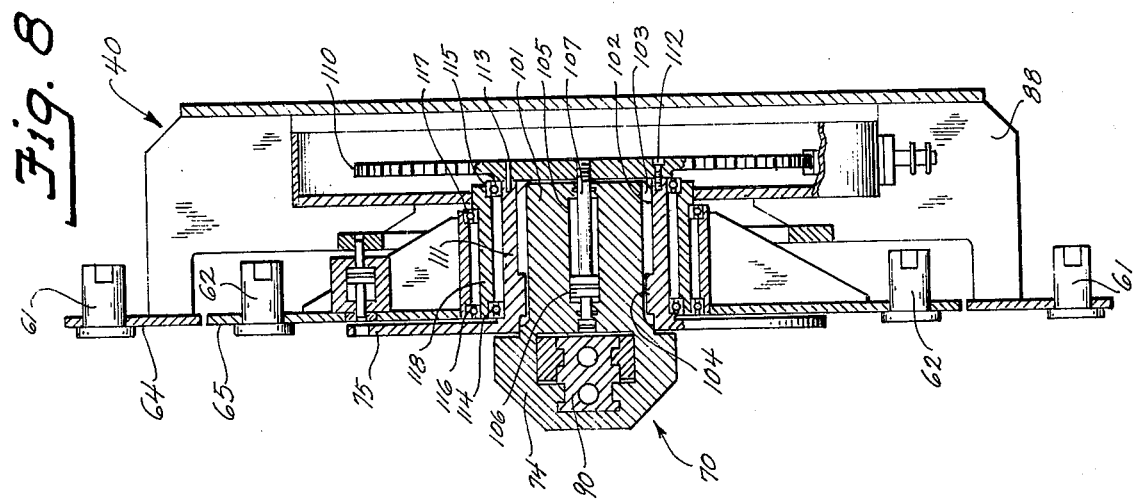

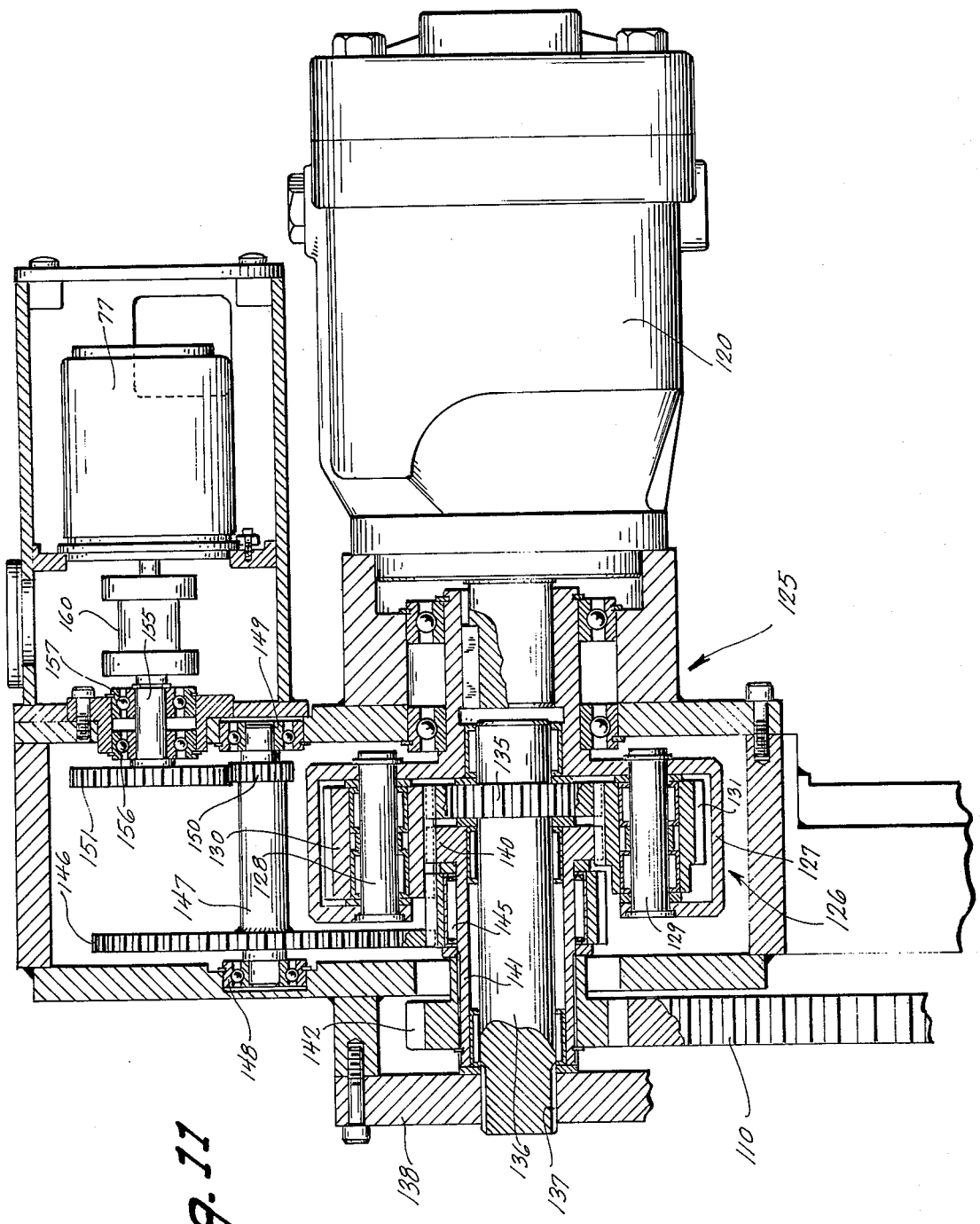

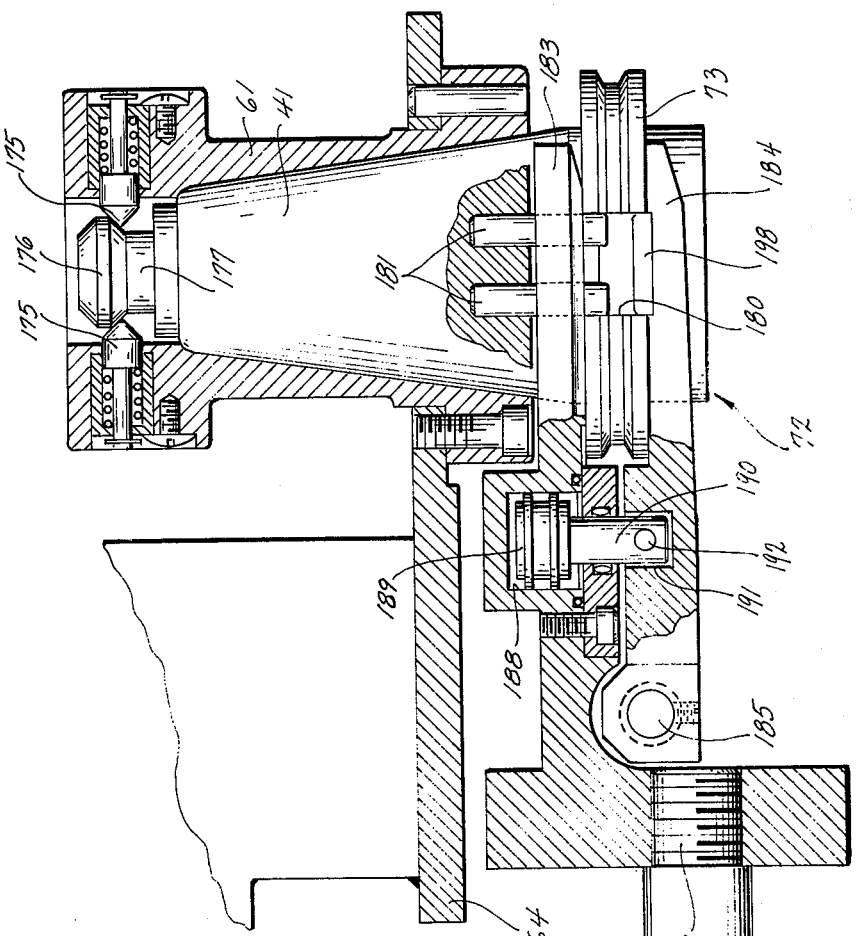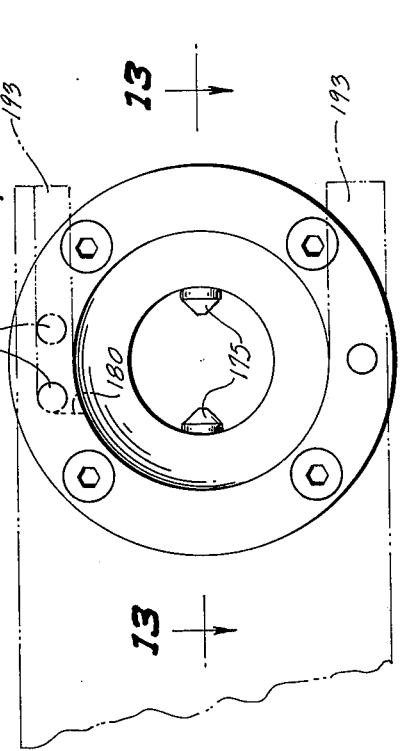

TOOL CHANGE MECHANISM FOR MACHINE TOOLS

BACKGROUND OF THE INVENTION

The invention relates generally to tool change mechanisms for machine tools.

The storage of a large number of tools for use with tool change mechanisms has been a problem. When it is only necessary to provide a modest number of tools, a circular rotary magazine can be readily mounted on the machine tool for storing the tools.

In this type of magazine, a circular or annular plate carries the tool receiving sockets and the plate is rotated to move the desired tool to the tool ready station. However, when larger numbers of tools are required, chain type storage magazines have been provided and the tool receiving sockets are carried by the chain which is moved in an established path of travel to move the sockets selectively to the tool ready station. Although the chains may be directed into paths that are not circular to better accommodate the machine tool frame, they still require a lot of space so that they become cumbersome on the machine tool. In order to conserve space, such magazines have been designed to move the chain in a tortuous path but this is expensive and subject to malfunctioning so that an excessive amount of maintenance is required. The present invention provides increased tool capacity in the magazine without the disadvantages of the chain type magazine by arranging two concentric circular rows of sockets on rigid plates and utilizing a tool transfer member for moving the tools between any one of the sockets and a tool ready position.

U.S. Pat. No. 3,760,491 discloses a tool change mechanism having a tool change arm mounted on a carrier that is pivotable between a tool change position and tool loading position as is done in the present invention. However, in that previous arrangement, the tool sockets are formed in cartridges which are removable from the chain. The carrier is provided with a clamping mechanism that clamps the cartridge to it when the carrier is in the loading position. When the carrier pivots to the tool change position, it removes the cartridge from the magazine and takes it to the tool change position where the tool change arm will operate to interchange tools between the spindle and the cartridge which is then being supported by the carrier.

The present invention retains this same concept of a pivotable carrier supporting a tool change arm to provide the same efficient operation, but a ready socket is an integral part of the carrier for movement with it between the loading position and the tool change position. When the carrier and its ready socket are in the loading position, the magazine tool transfer arm will remove the previously used tool from the ready socket and place a new tool in it for subsequent transfer to the spindle. This eliminates the complex and expensive tool storage chain with removable cartridges as well as the clamping mechanism on the carrier.

SUMMARY OF THE INVENTION

The improved tool change mechanism of the present invention includes a tool storage magazine having one or more circular rows of sockets. When more than one circle of sockets are provided, the circles may be concentric to conserve space but they may also be tangent to each other. A combination of concentric circles and tangent circles may also be arranged for maximum tool capacity.

When the circles are concentric, the outer circle of sockets is mounted on an annular plate while the inner row of sockets is mounted on a separate plate which may also be of annular configuration. The plate supporting the outer circle of sockets is fixed while the plate supporting the inner circle of sockets is arranged to rotate relative to the outer circle of sockets.

A tool transfer member is mounted within the inner circle of sockets and will function to remove and insert tools into either row of sockets. To this end, the tool transfer member is rotatable and is provided with a grip. The arm may be extended to move the axis into engagement with the tools in either row of sockets and is also movable toward and away from the plates for inserting and extracting the tools into and out of the sockets. The circle of sockets in the inner row is interrupted to create an opening through which the transfer arm may pass for engagement with the tools in the outer circle of sockets, and when the tool transfer member is functioning to remove tools from or insert them into the outer circle of sockets, the inner circle of sockets rotates with the transfer member to retain the opening in alignment with the transfer member. On the other hand, when the selected tool is in the inner circle of sockets, the inner circle is clamped in position and the tool transfer member is rotated relative to it for aligning its grip with the desired tool.

In operation, the tool transfer member will rotate either relative to the inner circle of sockets or in unison with it into alignment with the desired socket. The tool transfer member is then extended to align its grip with the socket for either inserting a tool into it or removing one from it.

The outer circle of sockets contains one open space which is adapted to receive a ready socket that is an integral part of a carrier that also operably supports a tool change arm. The carrier is pivotable between a loading position and a tool change position. When the carrier is in the loading position, its ready socket is a part of the outer circle of sockets in the magazine. The tool transfer member may then extract a previously used tool from this ready socket and return it to the proper socket in the magazine. In like manner, the transfer member will extract a selected tool from the magazine and insert it into the ready socket.

After the new tool has been inserted into the ready socket, the carrier is pivoted from its loading position to the tool change position. At this location, the tool change arm is in position to engage the previously used tool in the spindle and, at the same time, it engages the new tool in the ready socket. The tool change arm is moved axially to extract both tools, is rotated 180° to interchange their positions and is again moved axially, but in the opposite direction, to insert the previously used tool into the ready socket for return to the magazine and the new tool into the spindle for use in the next machining operation.

The foregoing and other objects of this invention, which will become more fully apparent from the following detailed description, may be achieved by means of the exemplifying apparatus depicted in and set forth in this specification in connection with the accompanying drawings.

DESCRIPTION OF THE DRAWINGS

FIG. 2 is a front view of the tool change mechanism shown in FIG. 1 with the grip on the tool transfer member in engagement with a tool contained in a socket that is disposed in the inner circle of sockets;

FIG. 3 is a front view of the tool change mechanism shown in FIG. 1 with the grip on the tool transfer member in engagement with a tool contained in the tool ready socket while the latter is in the loading position;

FIG. 4 is a front view of the tool change mechanism shown in FIG. 1 with the grip on the tool transfer member in engagement with a tool contained in a socket that is disposed in the outer circle of sockets;

FIG. 5 is a sectional view taken along the plane represented by the line 5—5 in FIG. 2;

FIG. 6 is a view in section taken along the plane represented by the line 6—6 in FIG. 4;

FIG. 7 is a plan view of the tool change mechanism shown in FIG. 1 with parts being broken away to show the interior mechanism, and the carrier being shown by solid lines in the loading position and by broken lines in the tool change position adjacent to the machine tool spindle;

FIG. 8 is a view mostly in vertical section through the center of the tool storage magazine shown in FIG. 1 with the tool transfer member being shown in its axially retracted position located adjacent to the magazine;

FIG. 9 is a view similar to that shown in FIG. 8 except that the tool transfer member is shown moved outwardly of the magazine;

FIG. 10 is a detail rear view showing the locking plunger for accurately locating and locking the tool transfer member in a selected position, the plunger housing being broken away to show the operating mechanism;

FIG. 11 is a detail view mostly in section depicting the transmission for driving the tool transfer member in its rotary movement and for actuating the decoder which locates the transfer member in its rotary position;

FIG. 12 is a detail front view of one of the sockets of the tool storage magazine with the grip of the tool transfer member being indicated in broken lines;

FIG. 13 is a detail view in section showing one of the sockets of the tool storage magazine with a toolholder in it and the tool transfer member grip being in engagement with the toolholder, the view being taken along the plane represented by the line 13—13 in FIG. 12; and FIG. 14 is a diagrammatic view showing an alternate embodiment of the present invention which includes an additional circle of tool storage sockets for increasing the capacity of the magazine.

DESCRIPTION OF THE PREFERRED EMBODIMENTS

Figure 1:
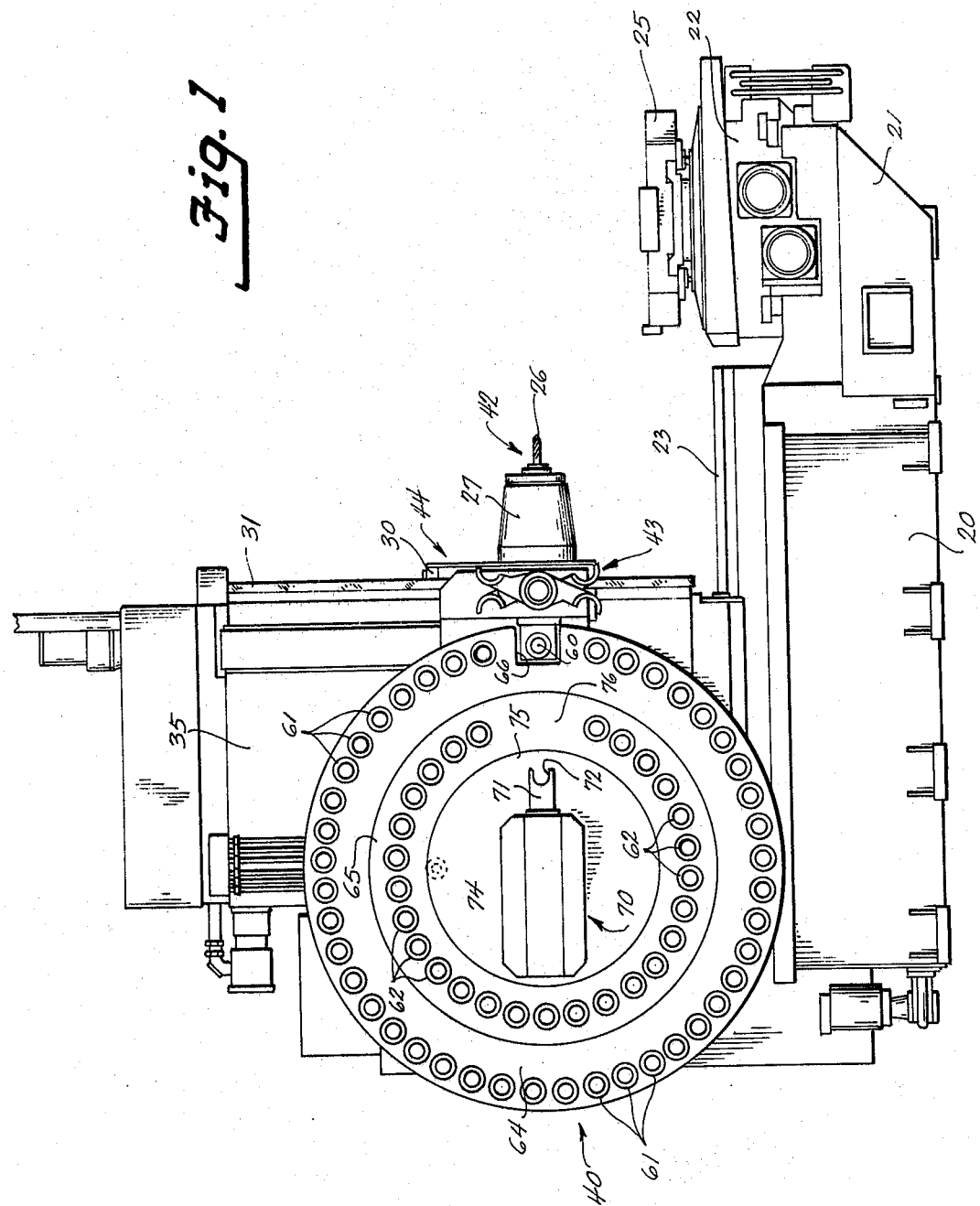
FIG. 1 is a front view of the improved tool change mechanism of the present invention being shown mounted on the side of a machine tool with which it may operate.

Reference is now made more particularly to the drawings and specifically to FIG. 1 thereof which illustrates a tool change mechanism constructed in accordance with the teachings of the present invention. The tool change mechanism is mounted on the left side of a machine tool with which it cooperates for automatically replacing the tool in the machine tool spindle for performing a subsequent machining operation.

The illustrated machine tool is a conventional machining center although it should be understood that the tool change mechanism can be applied to a variety of different machine tools. The illustrated machine tool comprises a bed 20 having a forward extension 21 on which is slidably mounted a work supporting table 22. The table 22 is movable in a horizontal path in a direction transverse to a pair of ways 23 carried by the bed 20. This path of travel of the table 22 is recognized in the art as the "X" axis of travel. A rotary table 25 is mounted on top of the table 22 and the workpiece is clamped to the rotary table 25 for performing a work operation on it. The table 25 is rotated to present different sides of the workpiece to a cutter 26 carried by a spindle 27.

The spindle 27 rotates the cutter 26 for carrying out the machining operation and it is carried by a spindle head 30 that is mounted on ways 31 for movement in a vertical path of travel which is known in the art as the "Y" axis of travel. The ways 31 are supported by an upstanding column 35 that is slidably mounted on the ways 23 for movement in a horizontal path transverse to the horizontal path of travel of the table 22 along the "Z" axis. Thus, the column 35, the spindle head 30, and the worktable 22 are movable rectilinearly in three mutually transverse paths of travel. In addition, the rotary table 25 produces rotary movement to provide a fourth axis of movement which may be referred to as the "C" axis of movement.

As clearly shown in FIG. 1, the tool change mechanism of the present invention is mounted on the left side of the column 35 for replacing the tool 26 in the spindle with any one of a plurality of tools carried by a tool storage magazine generally identified by the reference numeral 40. The cutter 26 is mounted in a toolholder 41 that is illustrated in FIG. 13, and the combination of the toolholder 41 and the cutter carrier thereby are transferred between the magazine 40 and the spindle 27. Accordingly, the combination of the toolholder 41 and the cutting tool 26 will be referred to generally as a tool 42. The replacement of the tool 42 in the spindle 27 is accomplished by means of a tool change arm generally identified by the reference numeral 43 and which is carried by a pivotal carrier 44.

As best shown FIG. 7, the carrier 44 is pivotable between a loading position illustrated in solid lines in FIG. 7 and a tool change position illustrated in broken lines in this same FIG. The carrier is pivotable about an axis 45 and is actuated in this pivotable movement by a piston and cylinder mechanism 46. To this end, a piston rod 47 extends outwardly of the piston and cylinder mechanism 46 and is provided with an eye 48 at its extending end for securement to the frame of the carrier 44. The piston rod 47 is retracted into the piston and cylinder mechanism 46 for moving the carrier 44 to its loading position as shown in solid lines in FIG. 7. The carrier 44 will be accurately located in the loading position by a stop 49 that is moved into abutment with the end of a stud 50.

The piston rod 47 is extended outwardly of the piston and cylinder mechanism 46 to pivot the carrier 44 in a counterclockwise direction from the position shown in solid lines in FIG. 7 to the tool change position shown by broken lines. The carrier 44 is accurately located in the tool change position by the movement of a stop 55 into abutment with a stud 56. A tool ready socket 60 is integrally formed with the carrier 44 for receiving a single tool 42 from either the spindle 27 or the tool storage magazine 40.

When the carrier 44 is in the loading position, as shown in solid lines in FIG. 7, the tool ready socket 60 is likewise in the tool loading position and it receives a new tool 42 from the magazine 40 in a manner to be later described. The tool 42 is inserted into the socket 60 and the carrier 44 is then pivoted in the counterclockwise direction to the tool change position, moving the socket 60 and its associated tool 42 with it. This places the tool change arm 43 in cooperating relationship with the spindle 27. The tool change arm then operates to simultaneously engage the tool 42 in the spindle 27, as well as the tool 42 in the socket 60. The tool change arm 43 then moves axially outwardly to extract the previously used tool from the spindle 27 and the new tool from the tool ready socket 60. It is then rotated 180° to interchange the positions of the two tools 42 and is then retracted into the carrier 44 for inserting the new tool 42 into the spindle 27 and the previously used tool into the tool ready socket 60. With this tool interchange completed, the carrier 44 is returned to the loading position where the previously used tool 42 is removed from the tool ready socket 60 and replaced in the appropriate socket in the magazine 40. A new tool 42 is then placed in the tool ready socket 60 so that it may be transferred to the spindle 27, in the manner described, for performing a subsequent machining operation. The details of the operation of the carrier 44 and the tool change arm 43 are described in greater detail in U.S. Pat. No. 3,760,491 issued on Sept. 25, 1973 to Frank Zankl and Earl R. Lohneis. The tool change arm 43 and the carrier 44 operate in exactly the same manner as described in that patent except that in the previous structure, the carrier 44 did not include the tool ready socket 60, but instead, actually extracted the tool and its associated cartridge from the magazine. In all other respects the carrier 44 and the tool change arm 43 are identical in structure and operation.

The tool storage magazine 40 includes an outer circle of sockets 61 and a concentric inner circle of sockets 62. The sockets 61 in the outer circle are carried by an annular plate 64 which is fixed and cannot rotate. The inner circle of sockets 62 is carried by an annular plate 65 and this plate 65 may be rotated selectively as will be described.

The outer circle of sockets 61 is interrupted to provide space for a rectangular opening 66 in the annular plate 64 which is adapted to receive the tool ready socket 60 when its associated carrier 44 is in the loading position, as illustrated in FIGS. 1 to 4. The inner circle of sockets 62 is also interrupted to create a clearance 76 for the operation of a tool transfer member generally identified by the reference numeral 70.

The tool transfer member 70 functions to extract tools 42 from either the outer circle of sockets 61 or the inner circle of sockets 62. To this end, it is provided with an extensible arm 71 having a grip 72 which grips a flange 73 which is formed on the toolholder 41, as best shown in FIG. 13. The arm 71 is slidably carried by a tool transfer member housing 74. The housing 74 is mounted on a rotary plate 75 which is rotatably supported by the frame of the tool storage magazine 40. The rotary plate 75 is rotated by power in a manner to be described and it may rotate in unison with the annular plate 65 when the tool transfer member 70 is operating with the outer circle of sockets 61. On the other hand, the plate 75 and the tool transfer member 70 may rotate relative to the annular plate 65 when the tool transfer member 70 is operating with the inner circle of sockets 62.

As previously mentioned, the inner row of sockets 62 is interrupted to create an opening or clearance 76 to permit passage of the grip 72 and arm 71 of the tool transfer member 70 when it is operating with the outer row of sockets 61. Accordingly, when the tool transfer member 70 is operating with the outer circle of sockets 61, the tool transfer member 70 is aligned with the opening 76, as illustrated in FIG. 1, and the annular plate 65 is locked to rotate with the tool transfer member to keep the opening 76 in such alignment. The entire unit is rotated until the grip 72 is in alignment with the designated socket 61 and such alignment is established by an encoder unit 77 which is depicted in FIG. 11. When the grip 72 is in alignment with the selected socket, the arm 71 is extended, as shown in FIG. 4, to engage the tool 42 in that socket. The tool transfer member 70, including its housing 74, are then moved away from the plate 75 to extract the selected tool 42 from the outer circle of sockets 61. The tool transfer member is then rotated from the position shown in FIG. 4 to the position shown in FIG. 3 where the tool 42 in the grip 72 is in alignment with the tool ready socket 60. The tool transfer member 70 is then moved inwardly toward the plate 75 to insert the new tool into the tool ready socket 60. After the grip 72 is withdrawn from engagement with the tool 42 in the tool ready socket 60, the carrier 44 will pivot to its tool change position to enable the new tool 42 in the tool ready socket 60 to replace the tool 42 in the spindle 27.

Of course, when the carrier 44 returns to the loading position, the grip 72 will move through the opening 76 to move into engagement with the tool in the tool ready socket 60. The reverse operation will then be completed in which the tool transfer member 70 is moved away from the plate 75 to extract the previously used tool from the socket 60. If this tool is to be returned to one of the sockets 61 in the outer circle, the plate 65 will rotate with the tool transfer member 70 until the tool 42 in the grip 72 is in alignment with the selected socket 61. The tool transfer member 70 is then moved inwardly toward the plate 75 to insert the previously used tool into the same socket 61 from which it was previously extracted.

When the tool transfer arm 70 is operating with one of the inner circle of sockets 62, the annular plate 65 is fixed in the position illustrated in FIG. 2. The tool transfer arm then rotates relative to the annular plate 65 to move its grip 72 into alignment with the socket 62 that contains the desired tool. With the annular plate 65 in this position, the opening 76 is properly located to permit passage of the grip 72 to the tool ready socket 60. The tool transfer arm then operates in the same manner as previously described to return the previously used tool from the tool ready socket 60 to the designated socket 62. In like manner, a new tool is retracted from one of the sockets 62 and is inserted into the tool ready socket 60 for transfer to the spindle 27.

The annular plate 65 is secured to the plate 75 for rotation with it as well as with the associated tool transfer member 70 by a double-ended piston and cylinder mechanism 80, as clearly shown in FIGS. 5 and 6. The piston and cylinder mechanism 80 also serves to secure the annular plate 65 and its associated sockets 62 in the position illustrated in FIG. 2 to enable the tool transfer member 70 to rotate relative to the annular plate 65.

The piston and cylinder mechanism 80 comprises a cylinder 81 that is fixed to the annular plate 65. A piston 82 is contained in the cylinder 81 and has a piston rod 83 extending from one side and another piston rod 84 extending from the opposite side.

When it is desired to lock the annular plate 65 to the rotary plate 75 so that the sockets 62 will rotate in unison with the tool transfer member 70, the latter is positioned to place its arm 71 and grip 72 in alignment with the opening 76, as illustrated in FIG. 1. Fluid pressure is then admitted into the cylinder 81 on the side of the piston containing the piston rod 84 to force the piston to one end of the cylinder for moving its piston rod 83 into a hole 85 formed in the plate 75. When it is desired to rotate the tool transfer member 70 relative to the sockets 62, the annular plate 65 is clamped in position with its opening 76 in alignment with the tool ready socket 60, as shown in FIG. 1, by admitting pressure into the opposite end of the cylinder 81. This moves the piston 82 in a direction to withdraw the piston rod 83 from the hole 85 and move the opposite piston rod 84 into a hole 86 which is formed in a plate 87 that is secured to a frame 88 which is mounted on the column 35 of the machine tool and supports the operating mechanism of the magazine 40. The piston rods 83 and 84 are arranged so that when the piston rod 83 is entering the hole 85, the piston rod 84 is still in engagement with the hole 86 and is not fully free of the hole 86 until complete engagement of the piston rod 83 is obtained in the hole 85. In like manner, when the piston 82 is moving in the opposite direction, the piston rod 84 enters the hole 86 before the piston rod 83 leaves the hole 85. With this arrangement there can be no slippage while the piston 82 is operating.

As is apparent from the previous description, the arm 71 of the tool transfer member 70 must be extended two different distances to accommodate the two circles of sockets 61 and 62. To this end, as clearly shown in FIGS. 5 and 6, the housing 74 of the tool transfer member 70 includes a slide 90 in which are formed two hydraulic cylinders 91 and 92. The cylinder 91 contains a piston 93 having a piston rod 94 extending outwardly therefrom for securement to the tool transfer arm 71. The arm 71 is shown fully retracted in FIG. 1 and to extend the arm into engagement with any one of the inner circle of sockets 62 it is only necessary to admit hydraulic pressure into the left side of the piston 93, as viewed in FIG. 5. This moves the piston to the right to extend the piston 94 and the tool transfer arm 71 outwardly to move the grip 72 into engagement with a tool 42 in any one of the sockets 62.

If it is necessary to move the grip 72 into engagement with a tool 42 in one of the outer circle of sockets 61, the piston rod 94 is extended as shown in FIG. 5, but in addition thereto, hydraulic pressure is admitted into the right side of a piston 95 that is contained in the cylinder 92. The piston 95 is attached to the housing 74 by a piston rod 96 which has its end opposite the piston threaded into the wall of the housing 74. Therefore, the admission of hydraulic pressure onto the right side of the piston 95 will cause the slide 90 to move outwardly of the housing 74 to the position shown in FIG. 6 and this causes the grip 72 to move into engagement with a tool 42 in one of the outer circle of sockets 61. The arm 71 is retracted by reversing the flow of hydraulic pressure in the cylinders 91 and 92.

In order to extract and insert tools into the tool ready socket 60, as well as the magazine sockets 61 and 62, it is necessary for the tool transfer member 70 to be moved rectilinearly toward and away from the plate 75. To this end, as shown in FIGS. 8 and 9, the housing 74 is provided with an inwardly extending post 101 that is slidably disposed within a cylinder 102. The post 101 is provided with a pair of diametrically opposed external splines 103 for engagement with cooperating diametrically opposed internal splines 104 extending from the wall of the cylinder 102. Engagement of the splines 103 and 104 prevents rotation of the post 101 in the cylinder 102.

A cylinder 105 is formed along the axis of the post 101 and contains a piston 106. A piston rod 107 is secured to one side of the piston 106 and extends outwardly therefrom into fixed engagement with the center of a ring gear 110. The ring gear 110 is fixed relative to the cylinder 102. The tool transfer member 70 iis shown in its retracted position in FIG. 8 where it will be normally located. When it is desired to extend the tool transfer member 70 outwardly for extracting tools from one of the sockets, hydraulic pressure is admitted into the cylinder 105 on the left side of the piston 106, as viewed in FIG. 8. Since the piston 106 is attached to the piston rod 107 and the latter is fixed relative to the cylinder 102, the entire post 101 will move outwardly to the position shown in FIG. 9 for extracting the engaged tool 42 from one of the sockets.

The cylinder 102 is formed within a hub 111 which has the plate 75 secured to it at one end and the ring gear 110 secured to it at the opposite end, the latter being attached to the hub 111 by screws 112 and dowels 113. The hub 111 is journalled in the frame 88 by bearings 114 and 115 to enable the plate 75, the hub 111 and the ring gear 110 to rotate in unison. Since the post 101 is arranged to rotate with the hub 111 by means of the splines 103 and 104, rotation of the ring gear 110 will cause a corresponding rotation of the tool transfer member 70.

The tool transfer member 70 must be capable of rotating relative to the annular plate 65 containing the sockets 62 so that annular plate 65 is provided with a hub 118 which is journalled by bearings 116 and 117 relative to the frame 88 on one side and is also in engagement with the bearings 114 and 115 on the opposite side so that it may rotate relative to the hub 111 to thereby enable the tool transfer member 70 to rotate relative to the annular plate 65.

As best shown in FIG. 11, power for rotating the tool transfer member 70 is obtained from a motor 120 which is connected to drive a transmission generally identified by the reference numeral 125. The motor 120 may be of any well-known type such as, for example, a fixed displacement piston type hydraulic motor. The transmission 125 serves to drive the ring gear 110 and its associated tool transfer member 70 in synchronism with the encoder 77 so that the encoder will identify the various sockets in well-known manner. The motor 120 actuates a planetary gear system generally identified by the reference numeral 126 and comprising a planet gear carrier 127 which supports two oppositely disposed shafts 128 and 129. The shaft 128 rotatably carries a planetary gear 130, while the shaft 129 in like manner rotatably carries a planetary gear 131. The planetary gears 130 and 131 are both in engagement with a fixed sun gear 135 that is rigidly mounted on a shaft 136. The shaft 136 is prevented from rotating by a splined end 137 in engagement with cooperating splines formed in a plate 138 that is rigidly secured to the transmission housing.

A rotating sun gear 140 is in engagement with both planetary gears 130 and 131 and is supported on a hub 141 that is journalled on the shaft 136 by suitable bearings to permit the gear 140 to be rotated by the revolving planetary gears 130 and 131. A pinion 142 is keyed to the end of the hub 141 and is in meshing engagement with the ring gear 110. Accordingly, rotation of the sun gear 140 by the planetary gears 130 and 131 will cause rotation of the pinion 142 to produce rotation of the ring gear 110.

A secondary output is provided from the planetary transmission 126 to produce a synchronized angular motion of the encoder 77. To this end, a secondary gear 145 is fixed to the hub 141 for for rotation with it so that it rotates simultaneously with the sun gear 140. The gear 145 has meshing engagement with a gear 146 that is mounted for rotation with a shaft 147 that is rotatably supported in the transmission housing by bearings 148 and 149. The end of the shaft 147, opposite the gear 146, is provided with a pinion 150 that is in meshing engagement with a cooperating gear 151.

The gear 151 is keyed to rotate with a shaft 155 that is journalled in the transmission housing by bearings 156 and 157. Accordingly, the shaft 155 will rotate with the gear 151 and it is connected to drive the encoder 77 by a coupling 160. The speed reduction to the gear 110 is identical to the speed reduction to the encoder 77 so that the two elements rotate in synchronism to enable the encoder 77 to identify the sockets 61 and 62.

As described, the motor 120 drives the transmission 125 for rotating the gear 110 to position the tool transfer member 70 at the specified angular location as identified by the encoder 77. After the tool transfer member 70 has been moved to the position located by the encoder 77, it is precisely positioned at this location and locked therein as shown in FIG. 10, by a plunger generally identified by the reference numeral 160. The plunger 160 comprises a cylinder 161 containing a cylindrical rod 162 which has a gear tooth 163 formed on its exterior end for engagement between the teeth of the gear 110. The rod 162 is provided with a keyway 164 for engagement by a dowel 165 that is mounted in the cylinder wall 161 and which serves to retain the gear tooth 163 in proper alignment with the teeth of the gear 110.

The end of the rod 162 opposite the gear tooth 163 is provided with a piston 166 for actuating the rod 162 in an axial movement. Thus, when hydraulic pressure is admitted into one side of the piston 166, it will move upwardly, as viewed in FIG. 10, to move the gear tooth 163 into meshing engagement with the teeth of gear 110. This serves to accurately position the tool transfer member 70 into precise alignment with the designated sockets 61 or 62. In addition, the engagement of the tooth 163 with the teeth of the gear 110 serves to securely lock the tool transfer member 70 in this position. On the other hand, when hydraulic pressure is admitted to the opposite side of the piston 166, it will move the piston downwardly, as viewed in FIG. 10, to withdraw the gear tooth 163 from engagement with the gear 110 and the latter will then be free to rotate again to reposition the tool transfer member 70.

A shaft 169 extends from one side of the piston 166 opposite the side having the rod 162, and the extending end of the shaft 169 is secured to a coupling 170. The coupling 170 has a lever 171 pivotally attached to it with the opposite end of the lever being connected to a switch 172 so that rectilinear movement of the coupling 170 will pivot the lever 171 for actuating the switch 172.

The switch 172 is provided with two sets of contacts (not shown) which are alternately engaged to indicate the position of the plunger 160. Thus, when the gear tooth 163 is in engagement with the teeth of the gear 110, the first set of contacts in the switch 172 is engaged to indicate in the electrical control circuit that the tool transfer member 70 is locked in position and cannot be rotated. On the other hand, when the gear tooth 163 is withdrawn from engagement with the teeth of the gear 110, the second set of contacts of the switch 172 is contacted to indicate in the electrical control circuit that the tool transfer member 70 is free to be rotated.

FIGS. 12 and 13 show the grip 72 in engagement with the flange 73 of a toolholder 41. The toolholder 41 is yieldably retained in the sockets 61 and 62 by a pair of spring urged plungers 175 that engage a head 176 mounted on the end of a post 177 extending from the rear end of the toolholder 41. The flange 73 of the toolholder 41 is provided with a keyway 180 that is engaged by a pair of dowels 181 secured in the socket 61. The engagement of the dowels 181 with the keyway 180 secures the toolholder 41 in the angular position with respect to the sockets 61 and 62. This same keyway 180, of course, engages a suitable key in the spindle 27 for obtaining positive driving engagement between the tool 42 and the spindle 27.

The grip 72 is secured to the end of the tool transfer arm 71 by a thread 182, as clearly shown in FIG. 13. The grip 72 includes an upper jaw 183 that engages the top of the flange 73 and a lower jaw 184 which engages the bottom of the flange 73. The lower jaw 184 is mounted for slight pivotal movement about an axis 185 for clamping the flange 73 between the two jaws. To this end, a cylinder 188 is formed in the jaw 183. A piston 189 is slidably disposed within the cylinder 188 and has a piston rod 190. The latter extends into an opening 191 formed in the lower jaw 184 and the piston rod is fixed to the lower jaw 184 by a pin 192. Each of the jaws 183 and 184 are formed of two extending fingers 193, as shown in FIG. 12, so that they straddle the toolholder 41.

When the jaws 183 and 184 are slid into engagement with the flange 73, the jaws are spread by admitting pressure in the cylinder 188 above the piston 189, as shown in FIG. 13, to pivot the jaw 184 away from the jaw 183 a slight amount. When engagement is obtained with the flange 73, the flow of hydraulic pressure in the cylinder 188 is reversed so that it is at the bottom of the piston 189, as viewed in FIG. 13, to draw the jaw 184 toward the jaw 183 to clamp the flange 73 between the two jaws. The jaw 184 is also provided with a key 198 that engages the keyway 180 of the toolholder 41 when the jaw 184 is moved into clamping engagement with the flange 73. This prevents any inadvertent angular movement of the tool 42 while the latter is being transferred to and from the ready socket 60.

FIG. 14 is a diagrammatic view showing an alternate embodiment of the invention in which the capacity of the tool storage magazine 40 is increased by adding a rotary plate 195 having a plurality of tool storage sockets 196. The sockets 196 are located in a circle that is tangent to the outer circle containing the sockets 61. If a tool 42 located in one of the sockets 196 is desired, the plate 195 is rotated to bring the desired tool 42 at a ready location 197. With the desired tool 42 at the location 197, the tool transfer member 70 is operated in the manner previously described to extract the tool 42 from the ready location 197, just as it would for removing any other tool 42 from one of the sockets 61. Such tool would then be transferred to the tool ready socket 60 in the carrier 44 for transfer to the spindle 27. On the other hand, a tool can be returned by the tool transfer member 70 from the tool ready socket 60 to the ready location 197 for returning the tool for storage in one of the sockets 196 in the rotary plate 195.

From the foregoing detailed description of the illustrative embodiments set forth herein to exemplify the present invention, it will be apparent that there has been provided an improved tool change mechanism for machine tools in which a tool storage mechanism has been provided with increased tool storage capacity while occupying a minimum amount of space in the machine tool. It also provides a tool storage magazine of simple and sturdy construction that requires a minimum of maintenance and in which the tools may be returned to the same tool storage sockets from which they were extracted so that large tools can be stored with an empty socket on each side of the tool.

Although the illustrative embodiments of the invention have been described in considerable detail for the purpose of disclosing a practical operative structure by which the invention may be practiced advantageously, it is to be understood that the particular apparatus described is intended to be illustrative only and that the novel characteristics of the invention may be incorporated in other structural forms without departing from the spirit and scope of the invention, as defined in the sub-joined claims.

What is claimed:

1. In a tool change mechanism for a machine tool having a work station;
    a tool storage magazine carrying a plurality of sockets for receiving tools to be used at said work station;
    a carrier supported for pivotal movement between a tool change position adjacent to said work station and a loading position adjacent to said magazine;
    a tool change arm operably mounted on said carrier for movement therewith;
    a tool ready socket formed in said carrier for supporting a tool in position to be engaged by said tool change arm so that the tool change arm may be operated when said carrier is in the tool change station for interchanging a new tool in said ready socket with the previously used tool in said work station; and
    transfer means operable when said carrier is in the loading position to remove the previously used tool from said ready socket and return it to said magazine and replace it with a new tool from said magazine for use at said work station.

2. A tool change mechanism according to claim 1 wherein said tool transfer means comprises a tool transfer member associated with said magazine for removing a tool from said ready socket at the loading station and placing it in a selected socket in said magazine and for extracting a tool from a designated socket in said magazine and inserting it into said ready socket at the loading station.

3. A tool change mechanism according to claim 2 wherein said tool transfer member is rotatably supported for moving it into angular alignment with any one of the sockets in said magazine; and including
    drive means for driving said tool transfer member in its rotary movement.

4. A tool change mechanism according to claim 3 including an encoder actuated by said drive means in synchronism with the rotation of said tool transfer member for controlling the rotation of said tool transfer member into angular alignment with any designated socket in said magazine.

5. A tool change mechanism according to claim 4 including a grip on the end of said tool transfer member for gripping the tools to be transferred; and
    means for extending said grip into axial alignment with the designated socket for engaging a tool in the socket or inserting a tool therein.

6. A tool change mechanism according to claim 5 including means for moving said tool transfer member laterally toward and away from the sockets in the magazine for inserting tools into said sockets and for extracting tools therefrom.

7. A tool change mechanism according to claim 1 wherein said tool storage magazine comprises an inner circle of sockets and a concentric outer circle of sockets; and
    said tool transfer means comprises a tool transfer member operable with either of said circles of sockets for removing a tool from said ready socket at the loading station and placing it in a designated socket in said magazine and for extracting a tool from a designated socket in said magazine and inserting it into said ready socket at the loading station.

8. A tool change mechanism according to claim 7 wherein said outer circle of sockets is interrupted to provide an opening for receiving said tool ready socket when said carrier is in the loading position so that said tool ready socket becomes a part of said outer circle of sockets.

9. A tool change mechanism according to claim 7 wherein said tool transfer member is located within said inner circle of sockets and including a grip on the end of said tool transfer member for gripping the tools to be transferred; and
    means for extending said grip two different distances into axial alignment with the sockets in said inner circle of sockets selectively as well as into axial alignment with the sockets in said outer circle of sockets selectively.

10. A tool change mechanism according to claim 9 wherein said inner circle of sockets is interrupted to form an opening to admit the passage of said grip when it is extended to reach said outer circle of sockets and including clamping means operable to clamp said inner circle of sockets for rotation with said tool transfer member while said grip is in alignment with the opening to enable the tool transfer member to operate with said outer circle of sockets, said clamping means being also operable to clamp said inner circle of sockets against rotation to enable said tool transfer member to rotate relative to said inner circle of sockets for operation with said inner circle of sockets.

11. In a tool storage magazine for carrying a plurality of tools to be used at a work station of a machine tool;
    a tool ready socket in said magazine for receiving a tool to be transferred to said work station for performing a work operation;
    a first annular plate fixedly mounted in said magazine and presenting an outer circle of sockets with each of said sockets being adapted to support one of the tools for use at the work station;

a second annular plate rotatably mounted in said magazine and presenting an inner circle of sockets concentric to said outer circle of sockets with each of said sockets being adapted to support one of the tools for use at the work station, said inner circle of sockets being interrupted to form an opening;

tool transfer means mounted within said inner circle of sockets and operable to extract a tool from the sockets in either of said annular plates and insert the extracted tool in said tool ready socket, said tool transfer means being movable through the opening in said inner circle of sockets for engaging the tools in said outer circle of sockets;

means connected to selectively rotate said tool transfer means into radial alignment with the tools in the sockets of either of said circles; and clamping means for clamping said second annular plate for rotation with said tool transfer member while it is in alignment with said opening so that said tool transfer member can rotate into alignment with a selected tool in said outer circle of sockets and move through said opening into engagement with the selected tool, said clamping means being also operable to secure said second annular plate against rotation and release it from said tool transfer member so that the latter may be rotated relative to said second annular plate for rotating into alignment with one of the tools in said inner circle of sockets and move into engagement with the selected tool.

12. A tool storage magazine according to claim 11 including:

extension means operable to extend said tool transfer means a first distance into engagement with a tool in said inner circle of sockets and to extend said tool transfer means a second distance into engagement with a tool in said outer circle of sockets.

13. A tool storage magazine according to claim 11 including:

an encoder connected to be rotated in synchronism with the rotation of said tool transfer means for controlling the rotation of said tool transfer means into radial alignment with any one of the sockets in either the outer or inner circles.

* * * * *